(12) United States Patent
Schaefer

(10) Patent No.: US 7,841,642 B2
(45) Date of Patent: Nov. 30, 2010

(54) RETRACTABLE TARPING SYSTEM

(75) Inventor: David Joseph Schaefer, Yankton, SD (US)

(73) Assignee: Shur Company, Yankton, SD (US)

( * ) Notice: Subject to any disclaimer, the term of this patent is extended or adjusted under 35 U.S.C. 154(b) by 1 day.

(21) Appl. No.: 12/345,000

(22) Filed: Dec. 29, 2008

(65) Prior Publication Data

US 2010/0164246 A1    Jul. 1, 2010

(51) Int. Cl.
*B60P 7/04* (2006.01)
(52) U.S. Cl. .................................. 296/98; 296/100.12
(58) Field of Classification Search .................... 296/98, 296/100.12

See application file for complete search history.

(56) References Cited

U.S. PATENT DOCUMENTS

| 4,991,901 | A | * | 2/1991 | Meekhof et al. | 296/98 |
| 5,002,328 | A | * | 3/1991 | Michel | 296/98 |
| 5,125,713 | A | * | 6/1992 | Willingham et al. | 296/98 |
| 6,276,735 | B1 | * | 8/2001 | Champion | 296/37.6 |

* cited by examiner

*Primary Examiner*—Dennis H Pedder
(74) *Attorney, Agent, or Firm*—Dicke, Billig & Czaja, PLLC

(57) ABSTRACT

A retractable tarping system including an end support surface, a shaft, a tarp, a spool, an end plate assembly, and a cable. The tarp and the spool are operably attached to the shaft. The end plate assembly is attached to the shaft for movement with respect to the first end support surface. The cable is attached to the end support surface and extends at least one time around the first spool.

13 Claims, 5 Drawing Sheets

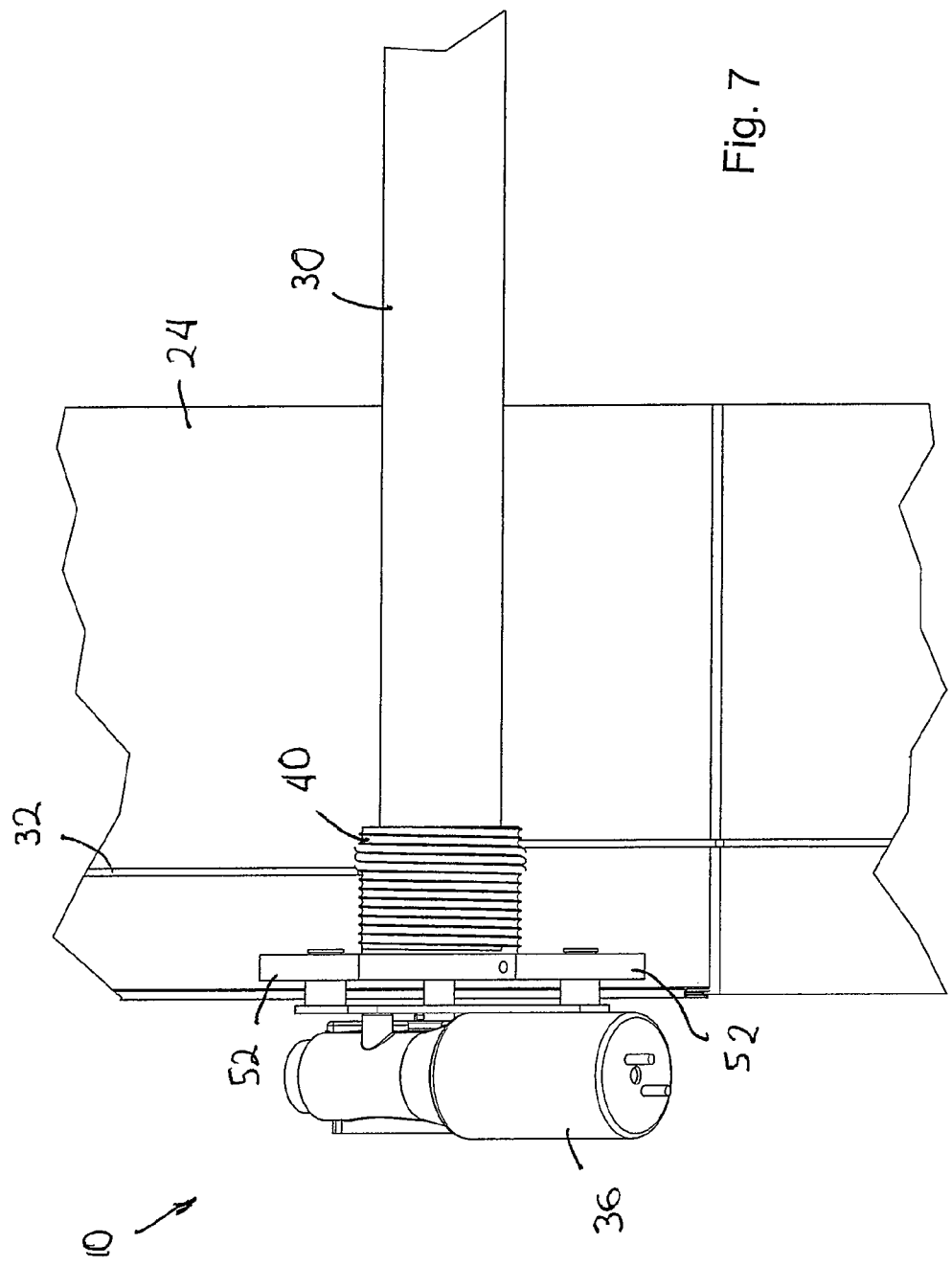

RETRACTABLE TARPING SYSTEM

FIELD OF THE INVENTION

The invention relates generally to a system for covering portions of vehicles. More particularly, the invention relates to a retractable tarping system.

BACKGROUND OF THE INVENTION

While many products are transported in packages or containers, many other products are transported in bulk where the desired amount of product is placed into the vehicle that is to be used to transport the product. The vehicles typically used to transport bulk products include trucks, trailers, rail cars, carts, wagons, and other various containers with open tops. These vehicles typically include an open top to facilitate placing the bulk product into the vehicle.

To reduce the potential of product falling out of the vehicle as the vehicle is moved and to reduce the potential of the product being damaged by environmental factors, it is customary to place a cover over the open top of the vehicle. To facilitate placing the bulk product into the vehicle, the cover is typically retractable such as rolling up.

An example of one such cover is marketed under the designation SRT-2 by AgriCover such as is illustrated in FIG. 1. This tarp system uses the tarp to pull the roll tube across the hopper as it rolls up the tarp. An internal torsion spring in each spool (similar to a garage door spring) is preloaded to provide tarp tension in the closed position. As the tarp is being rolled up and begins to grow in diameter, the roll tube begins moving faster than the cable is unrolling and the spools begin to turn slightly on the roll tube, winding the spring even tighter.

This increase in speed occurs because the tarp diameter becomes larger than the spools and the roll tube moves farther per revolution than the spools whose circumference remains the same. To close the tarp, the motor reverses and the torque tensioned spools "reel in" the cable, pulling the tube back across the hopper.

Other side roll-up tarp systems are marketed by Michel (FIG. 2) and Shur-Co., the assignee of this patent application, under the designation Super Duty Swing Arm Electric System (FIGS. 3-4). Both of these tarp systems use extension springs and spools that are rigidly mounted to the roll tube.

Michel's tarp system uses a tapered grooved spool and Shur-Co uses a narrow, flat bottom, grooveless cable spool. Both systems pull cable from a side mounted tube at a 90° angle as the roll tube moves across the caps. Both systems unroll cable from their respective spools as the tarp is opened. Both systems' roll tubes move further than the amount of cable unrolled, which results in extending the springs as the tarp moves to the open position thus giving the force needed to keep the cable tight allowing the spools to reel in the cable which closes the tarp.

SUMMARY OF THE INVENTION

An embodiment of the invention is directed to a retractable tarp system that includes a shaft, a first and second cable, cable spools, a tarp, and a motor or manual actuator. The shaft extends across the open top of the vehicle. The first and second cables are wrapped around the spools and tensioned with opposite ends thereof being secured to the vehicle. The spools are securely mounted over the ends of the shaft. The motor or manual actuator is operably attached to either shaft end to rotate the shaft which in turn moves the shaft back and forth across the box opening.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 7 is a top view of the tarping system of FIG. 5.

DETAILED DESCRIPTION OF THE PREFERRED EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
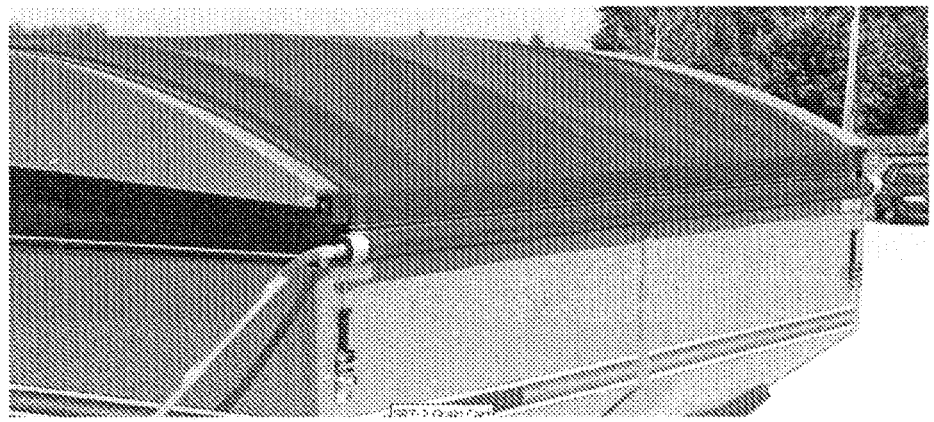
FIG. 1 is a perspective view of a prior art tarping system in a closed configuration.
Figure 2:
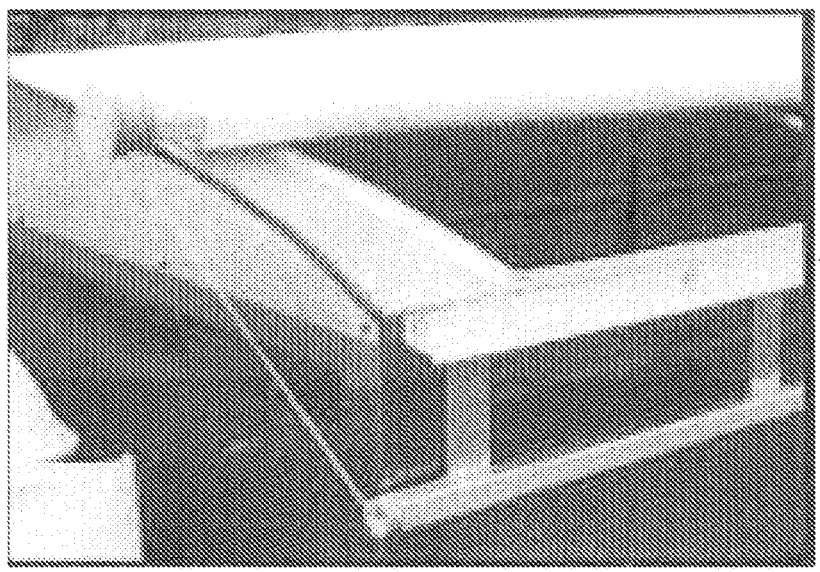
FIG. 2 is a perspective view of another prior art tarping system in a partially closed configuration.
Figure 3:
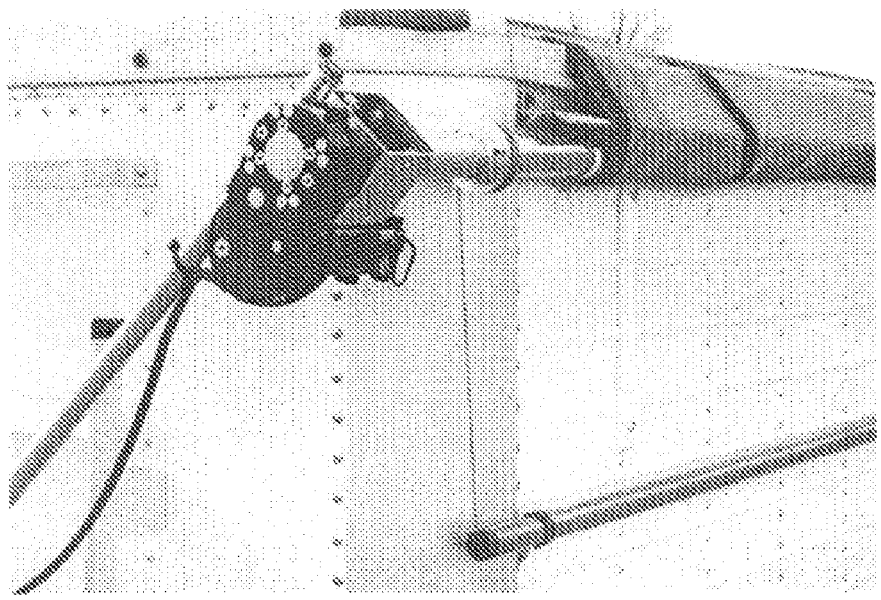
FIG. 3 is a perspective view of still another prior art tarping system in a closed configuration.
Figure 4:
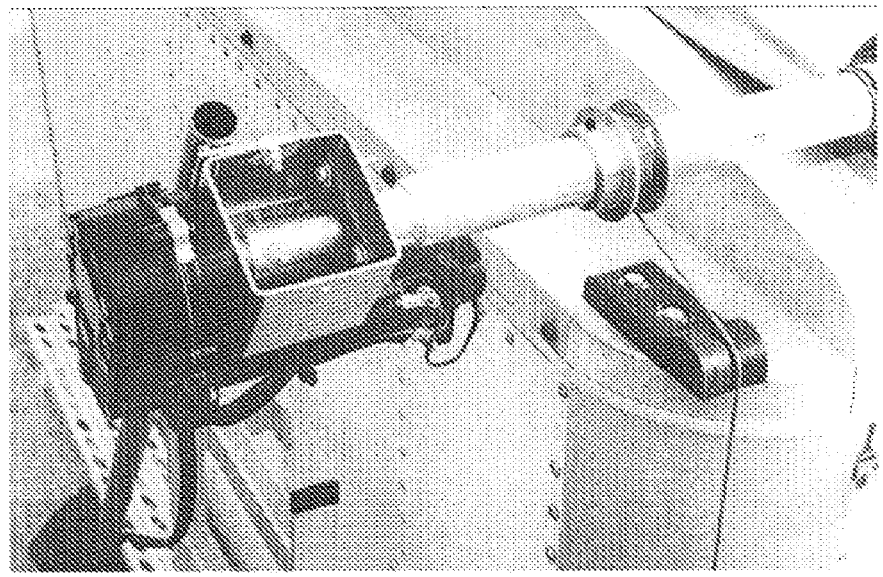
FIG. 4 is a perspective view of the tarping system of FIG. 3 in a partially closed configuration.
Figure 5:
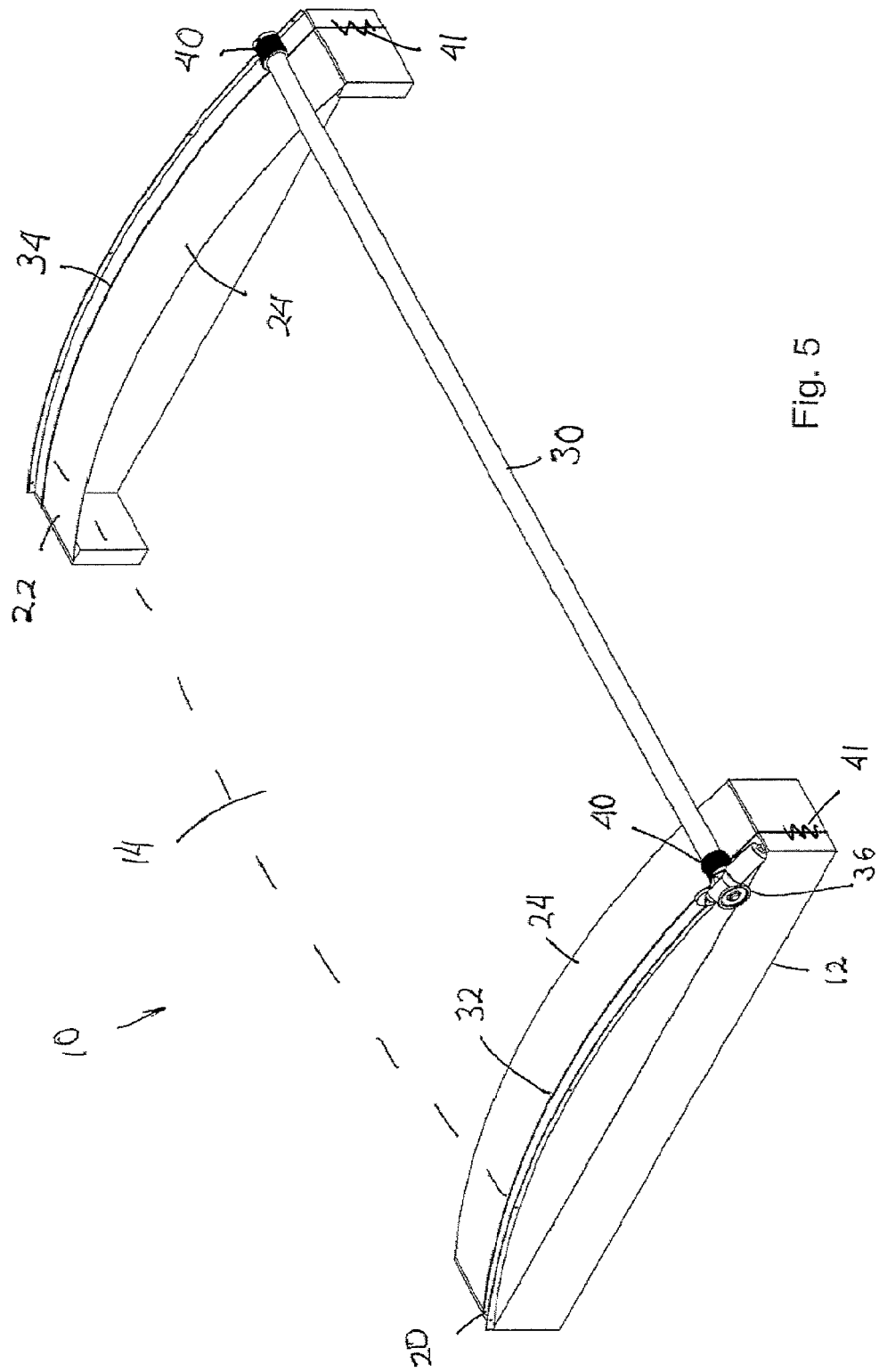
FIG. 5 is a perspective view of a tarping system according to an embodiment of the invention.
Figure 6:
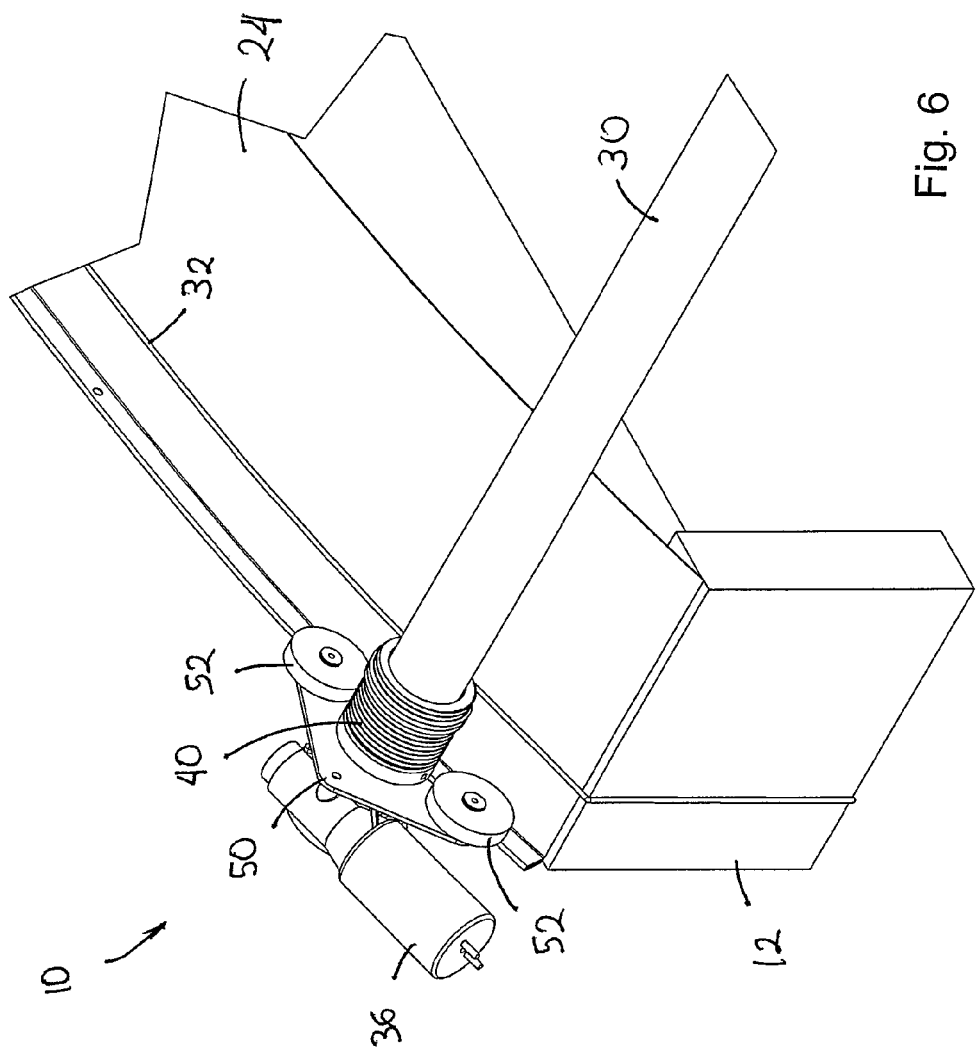
FIG. 6 is an enlarged perspective view of the tarping system of FIG. 5.

An embodiment of the invention is directed to a retractable tarping system, as illustrated at 10 in FIGS. 5-7. The retractable tarping system 10 may be used in conjunction with a vehicle, container, or box that is used for transporting products. One application that the retractable tarping system 10 is particularly suited for is open top trucks, trailers, rail cars, carts, wagons, and other various containers 12 that are used for transporting bulk products.

There are several features that are unique to this system. These features are: (1) the spools and cable propel the shaft in both the opening and closing directions. The tarp is not used to move the shaft and is simply along for the ride. (2) There is no torque arm required. Torque wheels on the motor mounting plate in conjunction with the cable tension keep the motor from turning. (3) "Unrolling tensioning," this feature allows the shaft to apply tension gradually when closing the tarp with a significant increase in torque at the shaft without sacrificing speed. (4) There is no additional "stored energy" device such as a spring that is used to assist in closing the tarp. This makes for a safer system, especially if being manually operated.

The retractable tarping system 10 enables a tarp 14 to be moved between an open configuration and a closed configuration. When the tarp 14 is in the closed configuration, the tarp 14 substantially covers the box opening 12 to which it is attached to thereby protect products placed in the box 12 from blowing out of the box 12 as well as from being damaged by environmental elements such as snow or rain. When the tarp 14 is in the open configuration, a substantial portion of the open top of the box 12 is not covered to facilitate placing products in the box 12.

While the retractable tarping system 10 is described and illustrated as rolling the tarp from side to side across the box 12, it is possible to use the concepts of the invention to rolling the tarp from front to back across the opening of the box. The front end 20 and the back end 22 of the box 12 may each include a support surface 24 over which the retractable tarping system 10 is rollable. These support surfaces 24 may be substantially flat, angled or convex. These support surfaces 24 may be included in the box 12 when manufactured or may be attached to the box 12 with the other components of the retractable tarping system 10.

The retractable tarping system 10 generally includes a shaft 30, a first cable 32, a second cable 34, a tarp 14 and a motor 36. The shaft 30 extends between the support surfaces 24 and is formed with a diameter and wall thickness to provide the shaft 30 with sufficient rigidity to support not only the shaft 30 but also the tarp 14 operably attached thereto. Rotating the shaft 30 thereby causes the tarp 14 to be rolled onto or off of the shaft 30.

A spool 40 is provided proximate each end of the shaft 30. Each spool 40 may have a plurality of spiral grooves formed in a surface thereof to reduce the potential of the cable 32, 34 slipping with respect to the spool 40 and provide the necessary distance of cable travel length to allow the cable to track across the face of the spool 40 as it opens and closes the tarp 14.

The first and second cables 32, 34 are pulled tight over the support surfaces 24 and attached at opposite ends thereof. To further reduce the potential of the first and second cables 32, 34 slipping with respect to the spool 40, the first and second cables 32, 34 may be wrapped at least once around the spool 40. In a preferred configuration, the first and second cables 32, 34 are wrapped around the spool 40 two or more times. The spools 40 thereby use the first and second cables 32, 34 as a track and pull both ends of the shaft 30 in substantial unison across the box 12.

To prevent slipping and keep both sides of the tarp 14 even, the cables 32, 34 should be maintained tight. To enhance the ability to maintain cables 32, 34 tight, a tension means 41 such as a spring may be used to insure the cables 32, 34 are always tensioned.

The motor 36 or manual actuator may be attached to either the front or back end of the shaft 30. The motor 36 may be selected with a variety of sizes and configurations depending on the size of the vehicle and the available power sources. The tarping system 10 may be of such design that in the event of a motor 36 failure, a single bolt may be removed from the spool 40 that will allow the shaft 30 to be manually operated from the other end. This may be accomplished without removing a still securely mounted inoperable motor 36 from the shaft 30.

An end plate assembly 50 may be operably attached to the motor 36. The end plate assembly 50 may include two rollers 52 that resist the torque of the motor 36, which in turn causes the shaft 34 to turn and move. The rollers 52 are mounted for rotation about axes that are offset from a rotational axis of the shaft 30, as illustrated in FIGS. 6 and 7. Alternatively, it is possible to fabricate end plate assembly 50 and the support surface 24 with at least one of the adjacent surfaces fabricated from a low friction material such that the end plate assembly 50 slides with respect to the support surface 24.

Because of the structure described herein, the retractable tarping system 10 of the invention is operable without energy storing devices such as springs to assist in returning the shaft 30 to the closed position. Additionally, because the spool 40 rolls on the support surface 24, the retractable tarping system 10 rolls and unrolls at a constant rate across the entire width of the box 12 and moves the same distance for each revolution.

On the other hand, the tarp 14 rolls and unrolls at a variable rate depending on how much fabric is on the shaft 30. If the spools 40 are properly sized, the tarp 14 can start out in the open position fully rolled up neatly on the shaft 30. As you begin to close a fully open tarp 14, the tarp 14 first is unrolling at a faster rate than the shaft 30 is moving. This situation creates a slight amount of slack in the tarp 14.

As the shaft 30 approaches the closed position, most of the tarp 14 has unrolled and the now smaller diameter roll is unrolling at a slower rate than the shaft 30 is moving. The previous slack is now taken up and as the shaft 30 goes over the side of the box 12, the tarp 14 is pulled tight. This all occurs while the shaft 30 is moving in the same direction. This phenomenon is called "unrolling tensioning"

A distinct advantage of the retractable tarping system 10 is that the tensioning of the tarp 14 is not abrupt as on every other system, but gradual. This is due to the fact that the tensioning occurs during the unrolling of the tarp 14 when it is being unrolled at a slower rate than the shaft 30 is moving. This gives the motor 36 an additional mechanical advantage of up to 3 or 4 times the motor 36 torque rating. This configuration allows for a much smaller, less powerful, and less expensive motor to tension the tarp 14 as tight or tighter as the largest, most powerful motors currently used.

Other advantages of the retractable tarping system 10 include the absence of a torque arm, which allows for the entire system to be installed behind the front edge of the box. This is extremely useful when space is minimal. The retractable tarping system 10 also does not require the use of a latch plate. The configuration of the retractable tarping system 10 provides easy and safer manual operation with no springs to overpower and "load up" creating a potentially dangerous storage of energy. Because tensioned cables are provided at the front and back ends of the retractable tarping system 10, the system is extremely wind resistant at any point during its travel from open to closed position.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A retractable tarping system comprising:
a first end support surface having a first support end and a second support end;
a second end support surface having a third support end and a fourth support end;
a shaft having a first shaft end and a second shaft end;
a tarp operably attached to the shaft;
a first spool attached to the shaft proximate the first shaft end;
a first end plate assembly attached to the first shaft end, wherein the first end plate assembly is mounted for movement with respect to the first end support surface;

a first cable attached to the first end support surface to extend substantially between the first support end and the second support end, wherein the first cable extends at least one time around the first spool;

a second spool attached to the shaft proximate the second shaft end;

a second end plate assembly attached to the second shaft end, wherein the second end plate assembly is mounted for movement with respect to the second end support surface; and a second cable attached to the second end support surface to extend at least partially between the third support end and the fourth support end, wherein the second cable extends at least one time around the second spool;

a motor for causing the shaft to rotate with respect to the first end plate assembly; and at least one roller mounted to the first plate assembly for rotation about an axis that is offset from a rotational axis of the shaft.

2. The retractable tarping system of claim 1, wherein at least one of the first spool and the second spool have a spiral groove formed in a surface thereof that is adapted to at least partially receive the first cable and the second cable, respectively.

3. The retractable tarping system of claim 1, and further comprising:

a first tension means operably attaching at least one end of the first cable to the first end support surface; and a second tension means operably attaching at least one end of the second cable to the second end support surface.

4. A transportation vehicle comprising:

an enclosure having an upper end that is at least partially open, wherein the enclosure is adapted to receive product;

a first end support surface mounted to the enclosure proximate the upper end, wherein the first end support surface has a first support end and a second support end;

a shaft;

a tarp operably attached to the shaft, wherein the tarp is capable of at least partially covering the upper end;

a spool attached to the shaft;

a first end plate assembly attached to an end of the shaft, wherein the first end plate assembly is mounted for movement with respect to the first end support surface; and a first cable attached to the first end support surface to extend at least partially between the first end and the second end, wherein the first cable extends at least one time around the spool;

a motor for causing the shaft to rotate with respect to the first end plate assembly; and at least one roller mounted to the first plate assembly for rotation about an axis that is offset from a rotational axis of the shaft.

5. The transportation vehicle of claim 4, wherein the spool has a spiral groove formed in a surface thereof that is adapted to at least partially receive the first cable.

6. The transportation vehicle of claim 4, and further comprising a second end support surface mounted to the enclosure proximate the upper end, wherein the first end support surface is spaced apart from the second end support surface.

7. The transportation vehicle of claim 6, and further comprising a second end plate assembly mounted to the shaft opposite the first end plate assembly, wherein the second end plate assembly is mounted for movement with respect to the second end support surface.

8. The transportation vehicle of claim 4, and further comprising a tension means for operably attaching at least one end of the first cable to the first end support surface.

9. A method of covering an open top vehicle comprising:

providing a vehicle having an upper end that is at least partially open, wherein the enclosure is adapted to receive product support;

attaching a first end support surface to the vehicle proximate the upper end, wherein the first end support surface has a first support end and a second support end;

attaching a tarp, a spool and a first end plate assembly to a shaft;

attaching a first cable to the first end support surface to extend at least partially between the first end and the second end, wherein the first cable extends at least one time around the spool; and rotating the shaft with respect to the first end support surface to roll the tarp on the shaft, wherein the first end plate assembly moves with respect to the first end support surface as the shaft is rotated;

a motor for causing the shaft to rotate with respect to the first end plate assembly; and at least one roller mounted to the first plate assembly for rotation about an axis that is offset from a rotational axis of the shaft.

10. The method of claim 9, and further comprising forming a spiral groove in a surface of the spool, wherein the spiral groove is adapted to at least partially receive the first cable.

11. The method of claim 9, and further comprising mounting a second end support surface to the vehicle proximate the upper end, wherein the first end support surface is spaced apart from the second end support surface.

12. The method of claim 11, and further comprising mounting a second spool and a second end plate assembly to the shaft opposite the first end plate assembly, wherein the second end plate assembly is mounted for movement with respect to the second end support surface.

13. The method of claim 9, and further comprising operably attaching at least one end of the first cable to the first end support surface using a tension means.

* * * * *